UNITED STATES PATENT OFFICE.

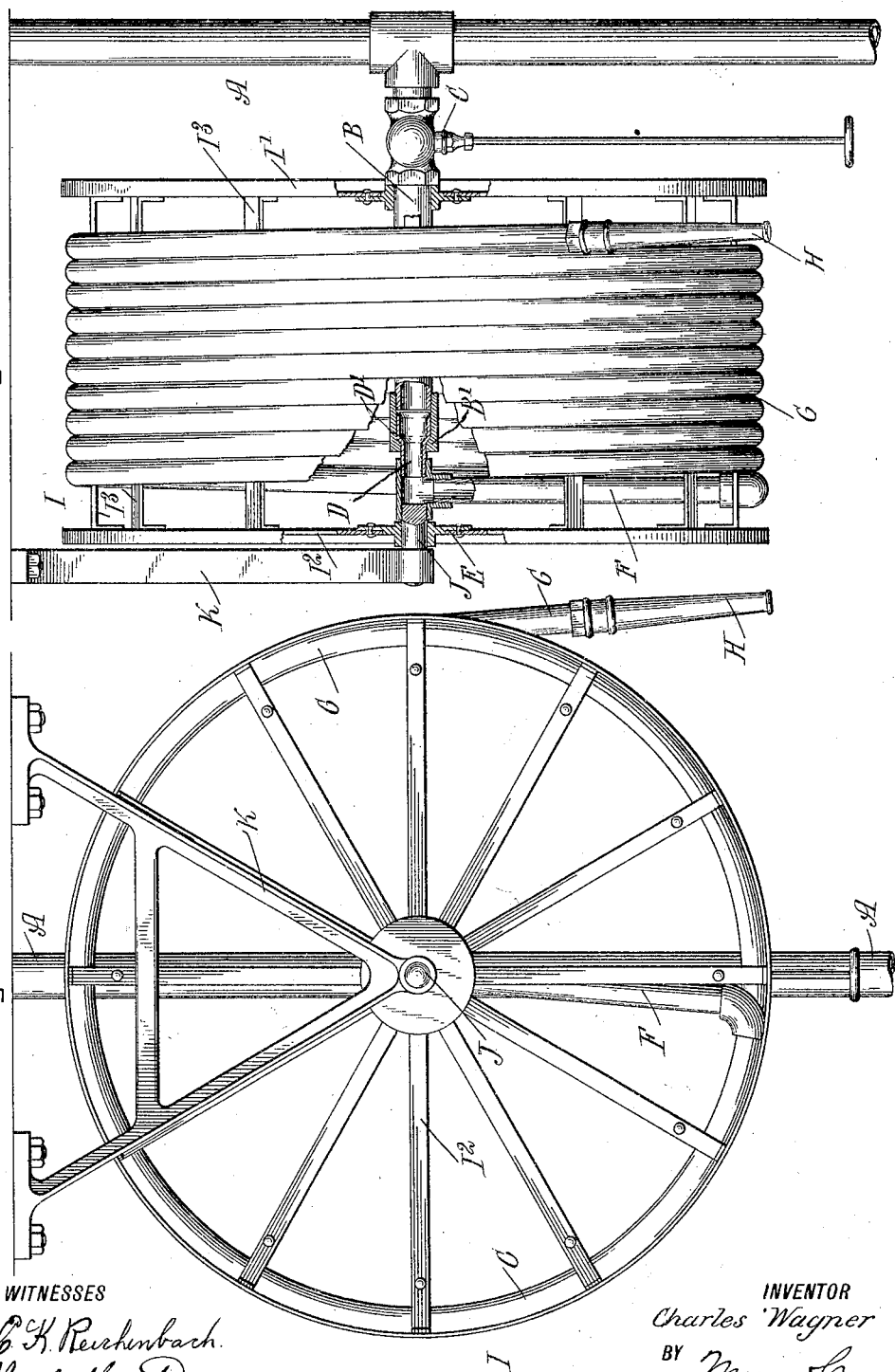

CHARLES WAGNER, OF GRANTWOOD, NEW JERSEY.

HOSE-REEL.

1,046,909. Specification of Letters Patent. Patented Dec. 10, 1912.

Application filed January 22, 1912. Serial No. 672,613.

*To all whom it may concern:*

Be it known that I, CHARLES WAGNER, a citizen of the United States, and a resident of Grantwood, in the county of Bergen and State of New Jersey, have invented a new and Improved Hose-Reel, of which the following is a full, clear, and exact description.

The object of the invention is to provide a new and improved hose reel more especially designed for use on stand pipes in buildings to permit of quickly unreeling the hose with the water turned on and allowing an almost instantaneous passage of the water through the hose as soon as a fire breaks out and the water is turned on from the stand pipe.

For the purpose mentioned use is made of a valved branch pipe extending horizontally from the stand pipe and forming a bearing for one end of the hose drum to rotate on, a radial pipe connected at its outer end with the hose, and a hollow bearing on the inner end of the said radial pipe and mounted to turn on the terminal of the branch pipe, the said hollow bearing and the said branch pipe terminal having joint members.

A practical embodiment of the invention is represented in the accompanying drawings forming a part of this specification, in which similar characters of reference indicate corresponding parts in both views.

Figure 1 is a side elevation of the hose reel; and Fig. 2 is a front elevation of the same with parts broken out and parts in section.

The stand pipe A in a building is provided on each floor with a horizontally-extending branch pipe B provided with a valve C normally closed and adapted to be opened by a person as soon as fire is discovered in the building or whenever needed. The terminal of the branch pipe B is provided with an internal conical seat B' engaged by the conical portion D' of a hollow bearing D to allow the latter to turn in the said seat B'. As shown in Fig. 2 the conical portion D' of the hollow bearing D is so arranged that the pressure of the water passing through the branch pipe B from the stand pipe A presses the said portion D' firmly onto the seat B' to form a tight joint with a view to prevent leakage of water passing from the branch pipe B into the hollow bearing D. From the bearing D extends radially a pipe F connected at its outer end with one end of a hose G provided at the other end with a nozzle H. The hose G is normally wound on a drum I consisting of ends or heads I', I² connected with each other by cross bars I³ for supporting the hose G, as plainly indicated in the drawings. The head I' is mounted to turn on the branch pipe B adjacent the valve C, and the head I² is mounted to turn on a trunnion J forming part of the outer end of the bearing D, and the said trunnion J is journaled in a hanger K attached to the ceiling or other support.

The operation is as follows: Normally the valve C is closed and the hose G is wound up on the reel I and when a fire breaks out the operator opens the valve C so as to turn on the water from the stand pipe A to allow water to pass through the branch pipe B, bearing D and pipe F into the hose G to be squirted through the nozzle H onto the fire. The operator on taking hold of the nozzle H and exerting a pull thereon can readily turn the drum I so as to unwind the hose from the drum to any desired length with a view to readily reach the fire.

It is understood that by the arrangement described the water passes through the hose G as soon as the valve C is opened and whether the hose G is still wound up, unwound, or partly unwound on the drum I. Thus hardly any time is lost in directing a stream of water onto the fire.

The hose reel shown and described is very simple and durable in construction, takes up comparatively little room and is arranged to permit of bringing the water readily into action for extinguishing a fire.

Having thus described my invention, I claim as new and desire to secure by Letters Patent:

In combination with a stand pipe having a horizontally-extending branch pipe provided at its terminal with an internal conical seat, and a valve on the said branch pipe adjacent the stand pipe, of a drum having one end mounted to turn on the said branch pipe adjacent the said valve, a hose adapted to wind and unwind on the said drum, one end of the hose having a nozzle, a hollow bearing having an inner conical portion mounted to turn in the said conical seat, the outer end of the said bearing terminating in a trunnion, a pipe disposed radially within the said drum and connected at its inner end with the said hollow bearing at a point between the trunnion and the said conical end, the outer end of the said pipe being connected with the other end of the said hose, and a fixed hanger in which the said trunnion is journaled.

In testimony whereof I have signed my name to this specification in the presence of two subscribing witnesses.

CHARLES WAGNER.

Witnesses:
THEO. G. HOSTER,
PHILIP D. ROLLHAUS.

Copies of this patent may be obtained for five cents each, by addressing the "Commissioner of Patents, Washington, D. C."